(12) United States Patent
Zhang et al.

(10) Patent No.: US 12,120,474 B2
(45) Date of Patent: Oct. 15, 2024

(54) ACTIVATION METHOD AND DEVICE, CONTROL DEVICE, NETWORK DEVICE AND OPTICAL NETWORK SYSTEM

(71) Applicant: ZTE CORPORATION, Guangdong (CN)

(72) Inventors: Weiliang Zhang, Guangdong (CN); Yong Guo, Guangdong (CN); Jun Shan Wey, Guangdong (CN); Liquan Yuan, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 101 days.

(21) Appl. No.: 17/624,783

(22) PCT Filed: Jun. 16, 2020

(86) PCT No.: PCT/CN2020/096257
§ 371 (c)(1),
(2) Date: Jan. 4, 2022

(87) PCT Pub. No.: WO2021/004235
PCT Pub. Date: Jan. 14, 2021

(65) Prior Publication Data
US 2022/0264202 A1      Aug. 18, 2022

(30) Foreign Application Priority Data
Jul. 5, 2019   (CN) .......................... 201910605819.3

(51) Int. Cl.
*H04Q 11/00*    (2006.01)
*H04B 10/27*    (2013.01)

(52) U.S. Cl.
CPC ......... *H04Q 11/0067* (2013.01); *H04B 10/27* (2013.01); *H04Q 2011/0079* (2013.01); *H04Q 2011/0086* (2013.01)

(58) Field of Classification Search
CPC ................... H04Q 11/0067; H04Q 2011/0079
See application file for complete search history.

(56) References Cited

U.S. PATENT DOCUMENTS

| 2014/0161461 A1* | 6/2014 | Lee | ........................ | H04J 3/0682 |
|---|---|---|---|---|
| | | | | 398/79 |
| 2016/0006608 A1* | 1/2016 | Khotimsky | ......... | H04L 41/0806 |
| | | | | 398/67 |

(Continued)

FOREIGN PATENT DOCUMENTS

WO     WO2010/02647      *   4/2010   ........... H04B 10/272

OTHER PUBLICATIONS

European Patent Office, EP20836152.7 Extended European Search Report issued on Jun. 26, 2023.

(Continued)

*Primary Examiner* — Nathan M Cors
(74) *Attorney, Agent, or Firm* — Li & Cai Intellectual Property (USA) Office

(57) ABSTRACT

Embodiments of the present disclosure provide an activation method, an activation device, a control device, a network device and an optical network system. A new-system ONU is activated on a first OLT in an existing system, and then activation information of the new-system ONU is sent to a second OLT in a new system by the first OLT or by an activation agent ONU which has been activated on the second OLT, thereby enabling activation of the new-system ONU on the second OLT.

13 Claims, 8 Drawing Sheets

(56) References Cited

U.S. PATENT DOCUMENTS

| | | | |
|---|---|---|---|
| 2016/0234582 A1* | 8/2016 | Ronald | H04L 41/0668 |
| 2017/0324471 A1* | 11/2017 | Cress | H04B 10/032 |
| 2019/0387295 A1* | 12/2019 | Zhang | H04L 12/4641 |

OTHER PUBLICATIONS

Weiliang Zhang, et al., "TC layer aspects of dedicated activation wavelength for quiet window elimination in 50G-PON", ITU-T DRAFT, International Telecomunication Union, issued on Jun. 17, 2019.

Yuanqiu Luo, et al., "Higher Speed Passive Optical Networks Common Transmission Convergence Layer Specification", ITU-T Draft, International Telecomunication Union, issued on Nov. 18, 2019.

Weiliang Zhang, et al., "TC layer aspects of dedicated activation wavelength for quiet window elimination in 50G-PON", ITU-T Draft, International Telecomunication Union, issued on Oct. 17, 2019.

Weiliang Zhang, et al., "Low Latency Mechanism for Mobile-Centric PON", ITU-T Draft, International Telecomunication Union, issued on Oct. 16, 2019.

Weiliang Zhang, et al., "Text proposal of low latency ONU activation process", ITU-T Draft, International Telecomunication Union, issued on Apr. 15, 2020.

Weiliang Zhang, et al., "Dedicated activation wavelength for quiet window elimination in 50G-PON", TU-T Draft, International Telecomunication Union, issued on Apr. 3, 2019.

\* cited by examiner

ACTIVATION METHOD AND DEVICE, CONTROL DEVICE, NETWORK DEVICE AND OPTICAL NETWORK SYSTEM

CROSS-REFERENCE TO RELATED APPLICATIONS

This is a National Phase Application filed under 35 U.S.C. 371 as a national stage of PCT/CN2020/096257, filed on Jun. 16, 2020, an application claiming the priority of Chinese Patent Application No. 201910605819.3, filed on Jul. 5, 2019, the contents of which are incorporated herein in their entirety by reference.

TECHNICAL FIELD

The present disclosure relates to, but is not limited to, the field of communications.

BACKGROUND

Transmission delays in a Passive Optical Network (PON) are mainly caused by opening a quiet window by an Optical Line Terminal (OLT) for an Optical Network Unit (ONU) to be activated during activation of the ONU. During the opening of the quiet window, merely the ONU to be activated is allowed to transmit an uplink signal for activation, while other activated ONUs which operate normally cannot transmit uplink signals in the quiet window. Thus, if an ONU which operates normally needs to transmit uplink data during the opening of the quiet window, the transmitted uplink data will be delayed.

At present, standards organizations are discussing opening the quiet window on a channel dedicated to activation, but there are still several problems: when the channel dedicated to activation uses a wavelength resource of Dedicated Activation Wavelength (DAW) in an existing system, the DAW needs to be applied to both communication between an ONU and a low-latency OLT and communication between the ONU and an OLT in the existing system in an uplink direction, therefore, signals transmitted on the DAW channel need to be split with an optical splitter; but the signals which are split with the optical splitter are attenuated by about 3 dB, which may affect the existing system, and may, in a severe case, keep the OLT in the existing system from correctly analyzing the signals on the DAW channel.

SUMMARY

An embodiment of the present disclosure provides an ONU activation method, including: activating, by a first OLT, a new-system ONU through a DAW channel and acquiring activation information of the new-system ONU, where the first OLT is an OLT in an existing system; and sending, by the first OLT, the activation information of the new-system ONU to a second OLT in a new system.

An embodiment of the present disclosure further provides an ONU activation method, including: acquiring, by a second OLT, activation information of a new-system ONU on a first OLT in an existing system, where the second OLT is an OLT in a new system and the activation information is generated in an activation process of the new-system ONU on the first OLT through a DAW channel; and activating, by the second OLT, the new-system ONU according to the activation information.

An embodiment of the present disclosure further provides an ONU activation method, including: acquiring, by an ONU, activation information of a new-system ONU generated during activation of the new-system ONU on a first OLT in an existing system; and sending, by the ONU, the activation information to a second OLT in a new system through a service channel.

An embodiment of the present disclosure further provides an ONU activation method, including: activating an ONU on a first OLT in an existing system through a DAW channel, where the ONU is an ONU in a new system.

An embodiment of the present disclosure further provides an ONU activation device applied at a first OLT in an existing system, including: a first information acquisition module configured to activate a new-system ONU through a DAW channel and acquire activation information of the new-system ONU; and an activation information sending module configured to send the activation information of the new-system ONU to a second OLT in a new system.

An embodiment of the present disclosure further provides an ONU activation device applied at a second OLT in a new system, including: a second information acquisition module configured to acquire activation information of a new-system ONU on a first OLT in an existing system, where the activation information is generated in an activation process of the new-system ONU on the first OLT in the existing system through a DAW channel; and an ONU activation module configured to activate the new-system ONU according to the activation information.

An embodiment of the present disclosure further provides an ONU control device, including: a first activation control module configured to perform activation on a second OLT in a new system; an activation information acquisition module configured to acquire activation information of a new-system ONU generated during activation of the new-system ONU on a first OLT in an existing system; and an activation agent forwarding module configured to send the activation information to the second OLT through a service channel.

An embodiment of the present disclosure further provides an ONU control device, including: a second activation control module configured to activate an ONU on a first OLT in an existing system through a DAW channel, where the ONU is an ONU in a new system.

An embodiment of the present disclosure further provides a network device, including a processor, a memory, and a communication bus configured to enable connection and communication between the processor and the memory. The processor is configured to execute a first ONU activation program stored in the memory, so as to implement the first of the above ONU activation methods; or the processor is configured to execute a second ONU activation program stored in the memory, so as to implement the second of the above ONU activation methods; or the processor is configured to execute a third ONU activation program stored in the memory, so as to implement the third of the above ONU activation methods; or the processor is configured to execute a fourth ONU activation program stored in the memory, so as to implement the fourth of the above ONU activation methods.

An embodiment of the present disclosure further provides a PON system, including an existing system and a new system. The existing system includes a first OLT, and the new system includes a second OLT and a plurality of ONUs. The first OLT is a network device where the processor executes the first ONU activation program, the second OLT is a network device where the processor executes the second ONU activation program, a part of the plurality of the ONUs are network devices where the processor executes the third ONU activation program, and the remaining part of the plurality of the ONUs are network devices where the processor executes the fourth ONU activation program.

An embodiment of the present disclosure further provides a storage medium having at least one of a first ONU activation program, a second ONU activation program, a third ONU activation program, or a fourth ONU activation program stored therein. When the first ONU activation program is executed by one or more processors, the one or more processors implement the first of the above ONU activation methods; when the second ONU activation program is executed by one or more processors, the one or more processors implement the second of the above ONU activation methods; when the third ONU activation program is executed by one or more processors, the one or more processors implement the third of the above ONU activation methods; and when the fourth ONU activation program is executed by one or more processors, the one or more processors implement the fourth of the above ONU activation methods.

DETAIL DESCRIPTION OF EMBODIMENTS

In order to make the objectives, technical solutions and advantages of the present disclosure clearer, embodiments of the present disclosure are further described in detail below in conjunction with specific implementations and accompanying drawings. It should be understood that the specific embodiments described herein are merely intended to explain the present disclosure, rather than limiting the present disclosure.

Figure 1:
FIG. 1 is a schematic diagram illustrating communication between an OLT and an ONU in a PON system according to the present disclosure.

FIG. 1 shows conventional network architecture of PON, in which a channel between an OLT and an ONU transmits both data and management information, that is, the OLT 11 and the ONU12 communicate with each other through one channel. With the development of mobile networks, the PON has gradually become one of the bearer technologies for mobile fronthaul, mobile backhaul, sensor network and in-vehicle network, and those network services have strict transmission delay requirements for mobile networks and even for a PON as a bearer network in practical applications.

The transmission delays in the PON include: an optical transmission delay, a delay caused by opening a quiet window, and a delay due to bandwidth allocation. The optical transmission delay is related to a distance of an optical fiber, and transmission time in the case of 20 Km is about 100 us.

Quiet window opening is carried out for an OLT to discover an ONU and perform ranging on the ONU, and belongs to an overhead caused by connection initialization of a channel between the OLT and the ONU. In order to discover an ONU 20 Km away from the OLT, a quiet window is needed to be opened for 200 us, but a normally operating ONU (i.e., an ONU which has been discovered and subjected to ranging by the OLT) is not allowed to communicate with the OLT normally during the opening of the quiet window, and may resume normal service transmission/reception with the OLT until the quiet window is closed. Furthermore, the OLT needs to periodically open a quiet window in order to discover ONUs quickly, and the period is related to practical applications. If it is desired that registration of an ONU can be completed at the second level, the period should be at the second level, that is, a quiet window for up to 200 us should be opened every 1 second. In such case, the uplink data transmitted by the normal operating ONUs may be delayed by 200 us frequently. In addition to a case where the ONU is registered on the OLT, a quiet window also needs to be opened in a case where the OLT performs ranging on the ONU. Therefore, the process of activating the ONU on the OLT may seriously affect a service transmission delay of activated ONUs, and degrade communication experience of users.

Figure 2:
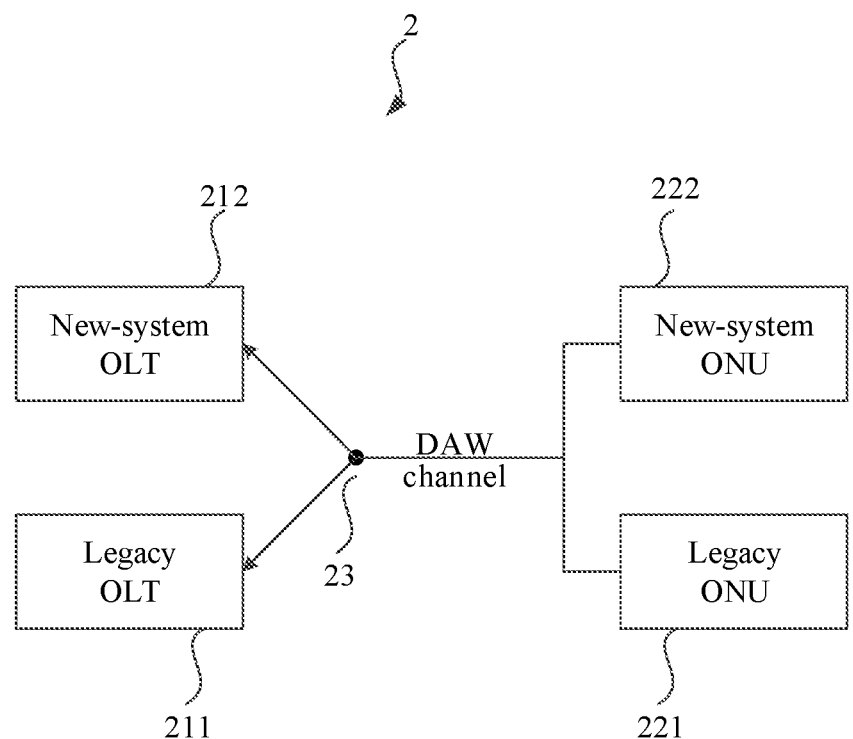
FIG. 2 is a schematic diagram illustrating activation of a new-system ONU through a DAW channel according to the present disclosure.

Therefore, if an ONU is activated on an OLT through a service channel of the ONU, the services of other ONUs may be seriously affected. A solution to ONU activation using the DAW resource is proposed, aiming to avoid delaying communication services on service channels. However, since the DAW is a communication resource in an existing system, as shown in FIG. 2, when the existing system and a new system (e.g., a low-latency system) exist in a PON system 2 at the same time, a Legacy ONU 221 needs to be activated on a Legacy OLT 211, and a new-system ONU 222 needs to be activated on a new-system OLT 212. In such case, if registration and ranging of the ONU are performed using the DAW in the existing system, an uplink DAW channel needs to connect the Legacy ONU 221 to the Legacy OLT 211 and also connect the new-system ONU 222 to the new-system OLT 212, so that an optical splitter 23 is needed to be provided on the DAW channel. The optical splitter 23 may split the DAW channel into two channels for transmitting information to the Legacy OLT 211 and the new-system ONU 222 respectively. Nevertheless, the disposition of the optical splitter 23 may cause the attenuation of the signals on the DAW channel, and thus affect analysis of the signals on the DAW channel by the Legacy OLT 211 in the existing system.

The activation methods, the activation devices, the control device, the network device and the optical network system provided by the present disclosure are mainly used for solving the problem that the communication of the existing system is affected by the signal attenuation in the existing system caused by the optical splitter, which is provided because the wavelength resource in the existing system is used as a third wavelength.

Embodiment One

Figure 3:
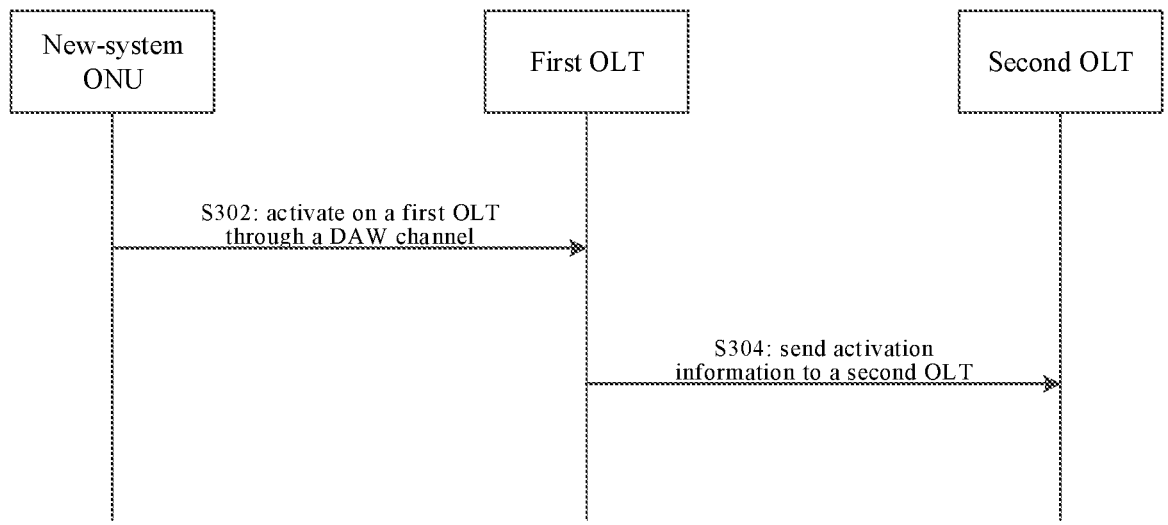
FIG. 3 is an interaction flowchart of an ONU activation method according to the present disclosure.

In order to solve the above problem, the present embodiment provides an ONU activation method, which mainly involves interaction between an existing-system OLT, a new-system OLT and a new-system ONU. For the convenience of introduction, the existing-system OLT is referred to as a "first OLT" and the new-system OLT is hereinafter referred to as a "second OLT", and please refer to an interaction flowchart between the new-system ONU, the first OLT and the second OLT in an ONU activation method shown in FIG. 3.

At operation S302, the first OLT activates the new-system ONU through a DAW channel and acquires activation information of the new-system ONU.

The activation process of the ONU on the OLT includes a registration process and a ranging process. In the registration process, the OLT mainly acquires a serial number (SN) of the ONU and determines whether the SN of the ONU exists in authentication information; and in the ranging process, after the OLT sends a ranging request, the ONU needs to send a ranging response to the OLT, the OLT calculates a ranging result and stores the ranging result locally or sends the ranging result to the ONU. Therefore, the activation information may include at least one of identification information of the new-system ONU or a ranging result. ONU identification information may be an SN of an ONU; and in some examples, the ONU identification information may further include a Media Access Control (MAC) address of the ONU, activation authentication information of the ONU and the like. In general, the new-system ONU is activated on the first OLT, and thus the activation information acquired by the first OLT from the new-system ONU includes the ONU identification information and the ranging result. The new-system ONU sends the ONU identification information to the first OLT, the first OLT passes the authentication of the new-system ONU, the new-system ONU completes the registration, the first OLT and the new-system ONU interchange the ranging request and the ranging response with each other, and the first OLT calculates the ranging result and stores the ranging result locally or sends the ranging result to the new-system ONU.

In the embodiment, the new-system ONU is activated on the first OLT through the DAW channel, but it should be understood by those of ordinary skill in the art that an ONU in an existing system may also be activated on the first OLT through the DAW channel. Since both the new-system ONU and the existing-system ONU are activated on the first OLT, there is no need to send some information to the first OLT and send the other information to the second OLT on the DAW channel, so that no optical splitter is needed to be provided on the DAW channel, and the DAW channel just needs to enable communication between the ONU and the first OLT. Therefore, the solution provided by the embodiment removes the optical splitter from the PON system successfully.

In the process of activating the new-system ONU, the first OLT may acquire the activation information of the new-system ONU.

At operation S304, the first OLT sends the activation information to the second OLT.

Since the new-system ONU needs to establish connection with the second OLT in the new system, the first OLT needs to send the acquired activation information of the new-system ONU to the second OLT after the new-system ONU is activated on the first OLT, so as to enable the second OLT to complete activation of the new-system ONU according to the activation information of the new-system ONU, thereby achieving initialization of a channel with the new-system ONU.

In some examples, the first OLT may send the activation information to the second OLT by itself; and in these examples, a predefined channel exists between the first OLT and the second OLT. The predefined channel here includes any one of the following channels: 1) an internal channel of a chip to which the first OLT and the second OLT belong; 2) an internal channel of a line card to which the first OLT and the second OLT belong; 3) an internal channel of a device to which the first OLT and the second OLT belong; 4) a directly connected channel, such as a straight through cable; or 5) a channel established through a third-party system, which may include, but is not limited to, a network management system.

Figure 4:
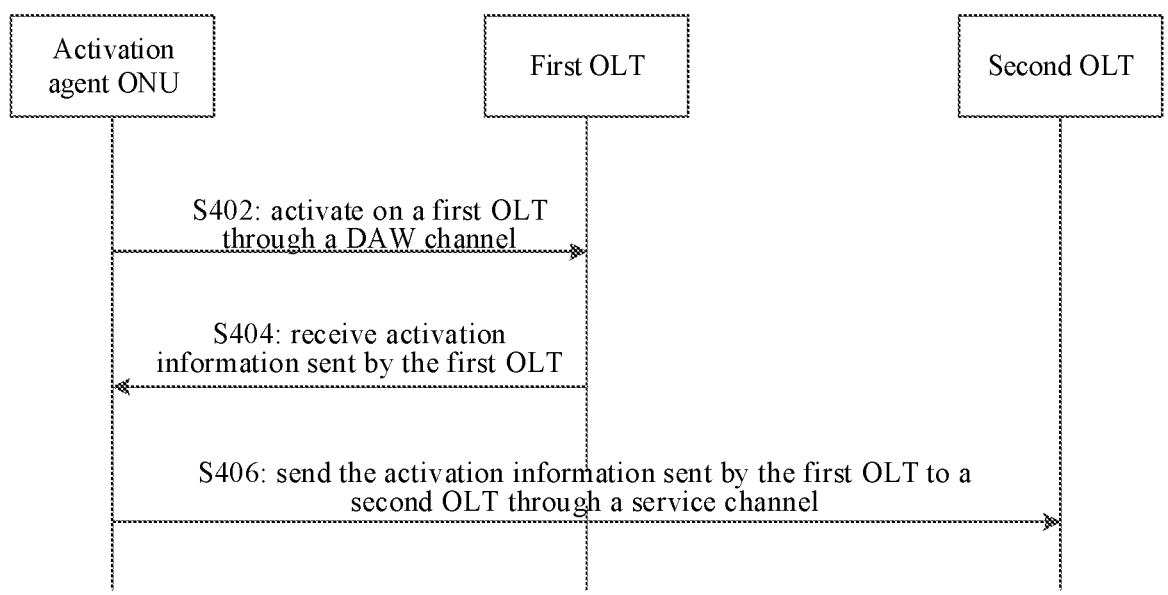
FIG. 4 is another interaction flowchart of an ONU activation method according to the present disclosure.

In some other examples, no predefined channel exists between the first OLT and the second OLT, or it is not convenient for the first OLT to send the activation information of the new-system ONU to the second OLT through the predefined channel to the second OLT. Therefore, the first OLT needs to send the activation information to the second ONU by other means in these examples. In these examples, the first OLT may send the activation information to the second OLT via the new-system ONU, and the new-system ONU used to send the activation information to the second OLT is referred to as an "activation agent ONU". Such solution to ONU activation is illustrated below by the interaction flowchart shown in FIG. 4.

At operation S402, the activation agent ONU is activated on the first OLT through the DAW channel.

The activation agent ONU is an ONU in the new system and is activated on the second OLT before being activated on the first OLT. Optionally, in some examples, one or more new-system ONUs may be activated on the second OLT if the second OLT initiates a registration procedure, but the second OLT activates merely one of the new-system ONUs and takes the activated new-system ONU as the activation agent ONU. In some cases, for example, the activation agent ONU needs to check the activation information of the other new-system ONUs on the first OLT, and the other new-system ONUs may not be activated on the first OLT in the existing system until the activation agent ONU is appointed. After the second OLT selected a current activation agent ONU from the ONUs in the new system, the second OLT may notify all the ONUs in the new system through broadcast messages, so that the activation agent ONU may be aware that it is selected as the activation agent ONU, and at the same time, the other ONUs may be aware of their failures in the competition.

After the activation agent ONU is aware that it is selected as the activation agent ONU, the activation agent ONU may be activated on the first OLT through the DAW channel. In some examples, the activation agent ONU needs to be activated on the first OLT before the other new-system ONUs are activated on the first OLT. However, in the embodiment, since the activation agent ONU receives the activation information sent by the first OLT and does not need to acquire the activation information of the other new-system ONUs by checking by itself, the activation agent ONU may be activated on the first OLT together with the other new-system ONUs, and may even be activated after all the other new-system ONUs are activated on the first OLT.

At operation S404, the activation agent ONU receives the activation information sent by the first OLT.

When each new-system ONU is activated on the first OLT, the first OLT acquires the activation information generated during the activation processes, and then the first OLT may send the acquired activation information to the activation agent ONU. Since the activation agent ONU and the first OLT are connected to each other through the DAW channel, the first OLT may send the activation information of the new-system ONUs to the activation agent ONU through the DAW channel. It should be understood that the first OLT may send the activation information of all the new-system ONUs that are activated on the first OLT to the activation agent ONU, and the activation information sent includes the activation information of the activation agent ONU generated when the activation agent ONU is activated on the first OLT.

At operation S406, the activation agent ONU sends the activation information sent by the first OLT to the second OLT through a service channel.

After receiving the activation information sent by the first OLT, the activation agent ONU sends the activation information to the second OLT. In the embodiment, since no DAW channel exists between the new-system ONU and the second OLT, the activation agent ONU may send the activation information acquired from the first OLT to the second OLT through the service channel.

The second OLT assigns an ONU-ID to corresponding ONU identification information (such as an SN of an ONU) according to the activation information acquired from the first OLT in the existing system, and performs calculation on the ranging result on the DAW channel according to a difference between a ranging result of the activation agent ONU on the DAW channel and that of the activation agent ONU on the service channel to obtain a ranging result on the service channel.

In the embodiment, no matter how the second OLT acquires the activation information of the new-system ONUs on the first OLT, the second OLT may determine an activation agent ONU in order to achieve activation of the new-system ONUs on the second OLT directly according to the activation information of the new-system ONUs on the first OLT. Firstly, the activation agent ONU is activated by the second OLT, so that the second OLT may acquire the activation information of the activation agent ONU on the local OLT (i.e., the second OLT); and then, the activation agent ONU is activated on the first OLT, so that the second OLT may also acquire the activation information of the activation agent ONU on the first OLT through forwarding by the activation agent ONU or through the predefined channel with the first OLT. For the convenience of introduction, the activation information of an ONU on the first OLT is referred to as "first activation information", and the activation information of the ONU on the second OLT is referred to as "second activation information".

After acquiring the first activation information and the second activation information of the activation agent ONU, the second OLT may determine a difference between the first activation information and the second activation information, that is, a difference between a distance from the activation agent ONU to the first OLT and a distance from the activation agent ONU to the second OLT. Since a difference between the activation information on the first OLT and the activation information on the second OLT is the same for any one of the new-system ONUs, the difference determined by the second OLT may represent the difference between the activation information of any one of the new-system ONUs on the second OLT and the activation information of the new-system ONU on the first OLT. Therefore, when the second OLT acquires activation information of other non-activation agent ONUs on the first OLT (i.e., the first activation information of the non-activation agent ONUs), the second OLT may determine activation information of the non-activation agent ONUs on the second OLT (i.e., the second activation information of the non-activation agent ONUs) according to the difference, so as to activate the non-activation agent ONUs according to the activation information of the non-activation agent ONUs on the second OLT.

It should be understood that the activation agent ONU may be replaced in the embodiment, for example, in some scenarios, if the original activation agent ONU is not suitable to be the activation agent ONU any more, the ONU may send a replacement request to the second OLT to request the second OLT to determine a new activation agent ONU. In some other scenarios, if the second OLT believes that the current activation agent ONU is not suitable to be an activation agent ONU any more, the second OLT may also initiate a replacement procedure actively. The second OLT may have already activated a plurality of new-system ONUs when the activation agent ONU is to be replaced, in which case the second OLT may directly select one ONU from the activated new-system ONUs when the activation agent ONU is needed to be replaced, and confirm the replacement with the selected ONU, and complete the change of the activation agent ONU after the replacement is confirmed.

If the original activation agent ONU is offline before the change of the original activation agent ONU on the second OLT is normally completed, and there are other new-system ONUs that have already been activated on the second OLT currently, the second OLT may take one of the activated new-system ONUs as a new activation agent ONU; but if no other ONUs have been activated on the second OLT currently, the second OLT reinitiates an activation procedure to appoint an activation agent ONU.

It should be noted that, after the change of the activation agent ONU is completed, the ONUs which are not activated on the second OLT need to be re-activated, and these ONUs include the new-system ONUs which are not activated on the first OLT, and the new-system ONUs which are activated on the first OLT but are not activated on the second OLT.

According to the ONU activation method provided by the present disclosure, the activation of the new-system ONU on the second OLT in the new system does not need to be performed through the service channel; moreover, when the new-system ONU sends the activation information through the DAW channel, it is the first OLT in the existing system to which the new-system ONU sends the activation information and there is no need to use the DAW channel to send the information to the second OLT, so that no optical splitter is disposed on the DAW channel, thereby avoiding affecting communication performance of the existing system.

Embodiment Two

Figure 5:
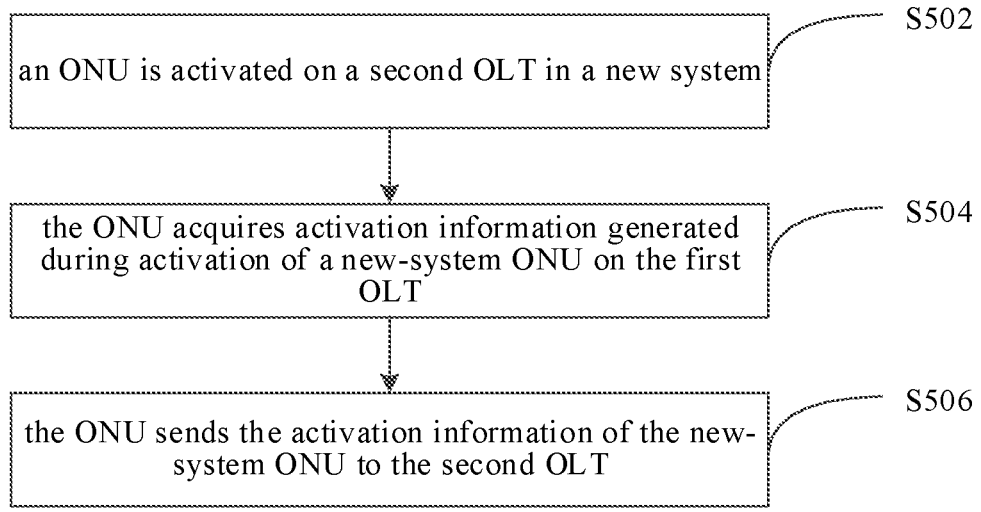
FIG. 5 is a flowchart illustrating an ONU activation method according to the present disclosure.

In the Embodiment One, the activation information of the new-system ONU generated during the activation of the new-system ONU on the first OLT is sent by the first OLT to the second OLT, and the first OLT may directly send the activation information to the second OLT by itself, or send the activation information to the second OLT through the activation agent ONU. The present embodiment provides another ONU activation method, in which the first OLT does not need to send the activation information to the second OLT or the activation agent ONU. FIG. 5 is a flowchart of the ONU activation method.

At operation S502, an ONU is activated on the second OLT in the new system.

In the embodiment, after the second OLT initiates a registration procedure, new-system ONUs may be activated on the second OLT. If an ONU is the first new-system ONU activated on the second OLT, the ONU may be directly activated and selected as an activation agent ONU by the second OLT. If other ONUs are activated on the second OLT together with such ONU, the second OLT allows the ONUs to compete, and then selects one of the ONUs to be activated and takes the selected ONU as the activation agent ONU. After the activation agent ONU is selected, the second OLT may send information related to the activation agent, for example, the information about the activation agent ONU may be notified to all new-system ONUs through broadcast messages, so that the ONUs are aware which one of the ONUs is the current activation agent ONU. As another example, the second OLT may just send the information that the activation agent ONU is determined, or the second OLT may notify other non-activated ONUs that activation procedures may be initiated, so as to enable the non-activated ONUs to start to carry out activation on the first OLT through a DAW channel and further carry out activation on the second OLT.

Since the solution of the embodiment aims to avoid the influence of disposition of an optical splitter on the DAW channel on an existing system, there is no DAW channel between the new-system ONU and the second OLT. Thus, the activation agent ONU completes activation on the second OLT through a service channel (e.g., a low-latency channel). Although in such case the second OLT needs to open a quiet window, since merely one ONU is directly activated on the second OLT and such activation of the ONU is carried out before operation of low-latency services, the opening of the quiet window does not cause transmission delay of the services. For the new-system ONUs which fail to be selected as the activation agent ONU, the new-system ONUs may not directly activated on the second OLT.

In some examples, the activation agent ONU may check activation processes of the other new-system ONUs on the first OLT after the activation agent ONU is activated on the second OLT. In the embodiment, since the activation agent ONU needs to acquire, by itself, the activation information of the other new-system ONUs generated during the activation of the other new-system ONUs on the first OLT, the activation agent ONU is generally activated on the first OLT before the other new-system ONUs are activated on the first OLT. The activation agent ONU may check the activation processes of the other ONUs on the first OLT even if the activation agent ONU is not activated on the first OLT.

When the activation agent ONU is activated on the first OLT, the activation process may be performed through a DAW channel. The activation agent ONU sends ONU identification information and a ranging response of the activation agent ONU to the first OLT through the DAW channel, and the first OLT calculates a ranging result of the activation agent ONU on the DAW channel and sends the ranging result to the activation agent ONU. The ONU identification information may be an SN of the ONU, or may be a MAC address of the ONU or activation authentication information of the ONU.

At operation S504, the ONU acquires activation information generated during activation of a new-system ONU on the first OLT.

For the activation agent ONU, the activation agent ONU may acquire the activation information thereof on the first OLT in the process of activating the activation agent ONU on the first OLT; for non-activation agent ONUs, that is, for the new-system ONUs which are confirmed that the current activation agent ONU is not themselves according to the broadcast messages sent by the second OLT, the new-system ONUs are activated on the first OLT through the DAW channel after the activation of the activation agent ONU on the second OLT is completed. In the processes of activating the non-activation agent ONUs on the first OLT, the activation agent ONU may check the activation processes to acquire the activation information of the non-activation agent ONUs.

At operation S506, the ONU sends the activation information of the new-system ONU to the second OLT.

After the activation agent ONU acquires the activation information generated during the activation of the new-system ONU on the first OLT, the activation agent ONU may send the acquired activation information to the second OLT. In the embodiment, since there is no DAW channel between the new-system ONU and the second OLT, the activation agent ONU sends the activation information acquired from the first OLT to the second OLT through the service channel.

The second OLT assigns an ONU-ID to corresponding ONU identification information according to the activation information acquired from the first OLT in the existing system, performs calculation on a ranging result on the DAW channel and applies the calculated ranging result to the service channel.

In the process of activating the activation agent ONU by the second OLT, the second OLT may acquire the activation information of the activation agent ONU on the second OLT, and then the activation agent ONU is activated on the first OLT, so that the second OLT may also acquire the activation information of the activation agent ONU on the first OLT. For the convenience of introduction, the activation information of an ONU on the first OLT is referred to as "first activation information", and the activation information of the ONU on the second OLT is referred to as "second activation information".

After acquiring the first activation information and the second activation information of the activation agent ONU, the second OLT may determine a difference between the first activation information and the second activation information, that is, a difference between a distance from the activation agent ONU to the first OLT and a distance from the activation agent ONU to the second OLT. Since a difference between the activation information on the first OLT and the activation information on the second OLT is the same for any one of the new-system ONUs, the difference determined by the second OLT may represent the difference between the activation information of any one of the new-system ONUs on the second OLT and the activation information of the new-system ONU on the first OLT. Therefore, when the second OLT acquires activation information of other non-activation agent ONUs on the first OLT (i.e., the first activation information of the non-activation agent ONUs), the second OLT may determine activation information of the non-activation agent ONUs on the second OLT (i.e., the second activation information of the non-activation agent ONUs) according to the difference, so as to activate the non-activation agent ONUs according to the activation information of the non-activation agent ONUs on the second OLT.

There is no doubt that the activation agent ONU in the embodiment may also be replaced, and reference may be made to the replacement process described in the Embodiment One for a specific replacement process, which is not repeated here.

According to the ONU activation method provided in the embodiment, the second OLT in the new system may allow the activation agent ONU to be activated firstly by the second OLT through selecting the activation agent ONU and then the activation agent ONU is activated by the OLT in the existing system, and the activation agent ONU may check the activation processes of the other new-system ONUs when the other new-system ONUs are activated on the first OLT to acquire the activation information of the other new-system ONUs, and feed the activation information back to the new system, so that the second OLT in the new system may acquire the activation information of the new-system ONUs without frequently opening a quiet window in the new-system ONUs, and complete the activation of the new-system ONUs accordingly, which reduces the influence on service transmission on the service channel as much as possible. Moreover, since most of the new-system ONUs are activated on the first OLT, and the second OLT acquires the activation information based on the activation processes of the new-system ONUs on the first OLT, the DAW channel just needs to be used for transmission of the activation information of the ONUs to the first OLT, and does not need to undertake transmission tasks from the ONUs to the second OLT, thereby removing the need to dispose an optical splitter on the DAW channel, and facilitating ensuring the communication performance of the existing system.

Embodiment Three

Figure 6:
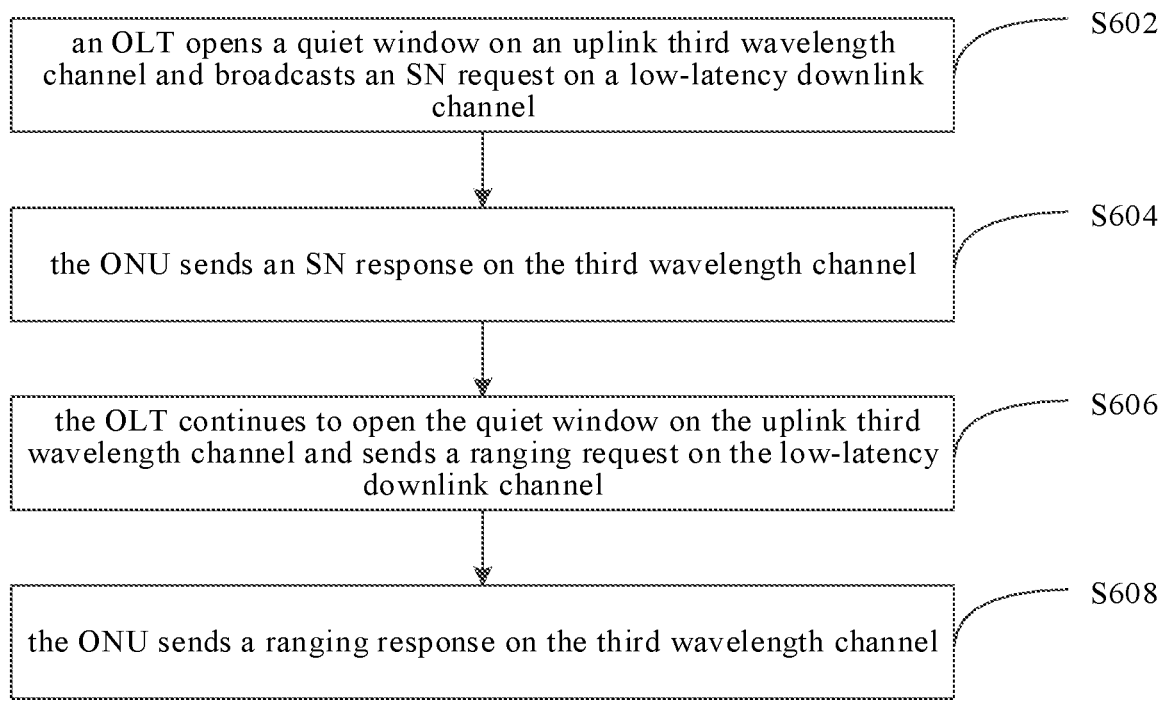
FIG. 6 is a flowchart illustrating an ONU activation method according to the present disclosure.

In the above embodiments, all the activation processes of the new-system ONUs (except for the activation process of the activation agent ONU on the second OLT) adopt the DAW, which is the wavelength resource of the existing system, as a wavelength resource dedicated to activation. If no existing system exists in a PON system, for example, with the continuous development of the PON system, the existing system is gradually replaced with the new system and the new system alone exists in the PON system, the new-system ONUs cannot use the DAW resource in the existing system for activation. In such case, another ONU activation method may be adopted, and the ONU activation method is described below with reference to the flowchart shown in FIG. 6. In the embodiment, it is assumed that ONU identification information is an SN of an ONU.

At operation S602, an OLT opens a quiet window on an uplink third wavelength channel and broadcasts an SN request on a low-latency downlink channel.

Since no existing system exists in the PON system in the embodiment, there is no doubt that the OLT here refers to an OLT in the new system, such as a low-latency OLT; similarly, all the ONUs in the embodiment are new-system ONUs, such as low-latency ONUs.

In the embodiment, a low-latency uplink channel and the low-latency downlink channel exist between the ONU and the OLT. Moreover, a channel dedicated to open quiet window for activation is provided and is referred to as a "third wavelength channel" in the embodiment. It should be understood that the third wavelength channel is neither a low-latency service channel nor a DAW channel.

When the OLT needs to discover an ONU, the OLT may open a quiet window on the third wavelength channel, so as to allow an unregistered ONU to send an SN response on the third wavelength channel in an uplink direction to achieve registration. While the quiet window is being opened on the third wavelength channel, the OLT may notify the ONU that registration may be carried out currently. In some examples, the OLT may notify the ONU by broadcasting. Optionally, the OLT may broadcast the SN request on the low-latency downlink channel.

At operation S604, the ONU sends an SN response on the uplink third wavelength channel.

After the ONU is powered on, the ONU operates with a wavelength corresponding to the low-latency downlink channel and a third wavelength. Therefore, after the OLT sends the SN request on the low-latency downlink channel, the ONU is capable of receiving the SN request. After receiving the SN request, the ONU sends the SN response, which may include an SN of the ONU, to the OLT through the third wavelength channel.

After receiving the SN sent by the ONU, the OLT may subject the SN of the ONU to authentication. Two authentication methods are provided below, and it should be understood that the two authentication methods are also applicable to the authentication processes in the above Embodiment One and Embodiment Two.

First Authentication Method:

In the first authentication method, authentication information may be configured in the OLT, so that the OLT may authenticate the SN according to the stored authentication information when receiving the SN sent by the ONU. In some examples, the authentication information includes an SN and a registration ID.

Second Authentication Method:

Unlike the first authentication method, the authentication information may be configured in an authentication server in the second authentication method. Thus, after the OLT receives the SN sent by the ONU, the OLT needs to send the SN to the authentication server, and the authentication server authenticates the SN according to the stored authentication information and returns an authentication result to the OLT. The OLT determines whether to allow the corresponding ONU to be registered according to the authentication result from the authentication server.

At operation S606, the OLT continues to open the quiet window on the uplink third wavelength channel and sends a ranging request on the low-latency downlink channel.

After the OLT allows for the registration of the ONU, the OLT may continue to open the quiet window. Meanwhile, the OLT sends the ranging request to the ONU through the low-latency downlink channel to request the ONU to perform ranging according to the ranging request.

At operation S608, the ONU sends a ranging response on the third wavelength channel.

After receiving the ranging request through the low-latency downlink channel, the ONU sends the ranging response thereof to the OLT through the third wavelength channel, so that the OLT may obtain a ranging result of the ONU according to the ranging response.

After receiving the ranging response, the OLT calculates a first ranging result of the low-latency downlink channel and the third wavelength channel, further calculates a second ranging result of the low-latency downlink channel and the low-latency uplink channel according to a relationship between the third wavelength channel (uplink) and the low-latency uplink channel, and then sends the second ranging result to the ONU. After receiving the second ranging result, the ONU may apply the ranging result locally, enter an operating state, and communicate with the OLT on the low-latency uplink and downlink channels.

After the ONU is activated in the PON, the ONU may process the uplink third wavelength channel in the following ways.

If a wavelength of the third wavelength channel and a wavelength of an uplink service channel (i.e., the low-latency uplink channel) are not coexistent, the ONU controls to close the third wavelength channel. When the wavelength of the third wavelength channel and the wavelength of the uplink service channel are not coexistent, the ONU should control to close the third wavelength channel in order to ensure that uplink services of the ONU may be normally transmitted on the uplink service channel.

If the wavelength of the third wavelength channel and the wavelength of the uplink service channel are coexistent, the ONU may process the third wavelength channel in any one of the following ways: 1) taking the third wavelength channel as a supplementary channel of the service channel to expand the capacity of the uplink service channel; 2) taking the third wavelength channel as a standby channel of the service channel, so that the uplink services of the ONU may be transmitted on the third wavelength channel when the uplink service channel fails, thereby improving disaster tolerance of the PON; 3) controlling the third wavelength channel to enter an energy-saving state, thereby reducing power consumption of the ONU; or 4) controlling to close the third wavelength channel.

The ONU activation method provided in the embodiment is mainly applied to a scenario where transition from the existing system to the new system is completed in the PON system. In such scenario, all the ONUs can achieve registration and ranging on the OLT through the uplink third wavelength channel, so as to be activated. Since the uplink third wavelength channel is a channel other than the low-latency service channel, opening the quiet window on the third wavelength channel does not affect service transmission of activated ONUs. Thus, compared with the method of opening the quiet window on the low-latency service channel, the method in the embodiment improves the communication performance of the PON system.

Embodiment Four

Figure 7:
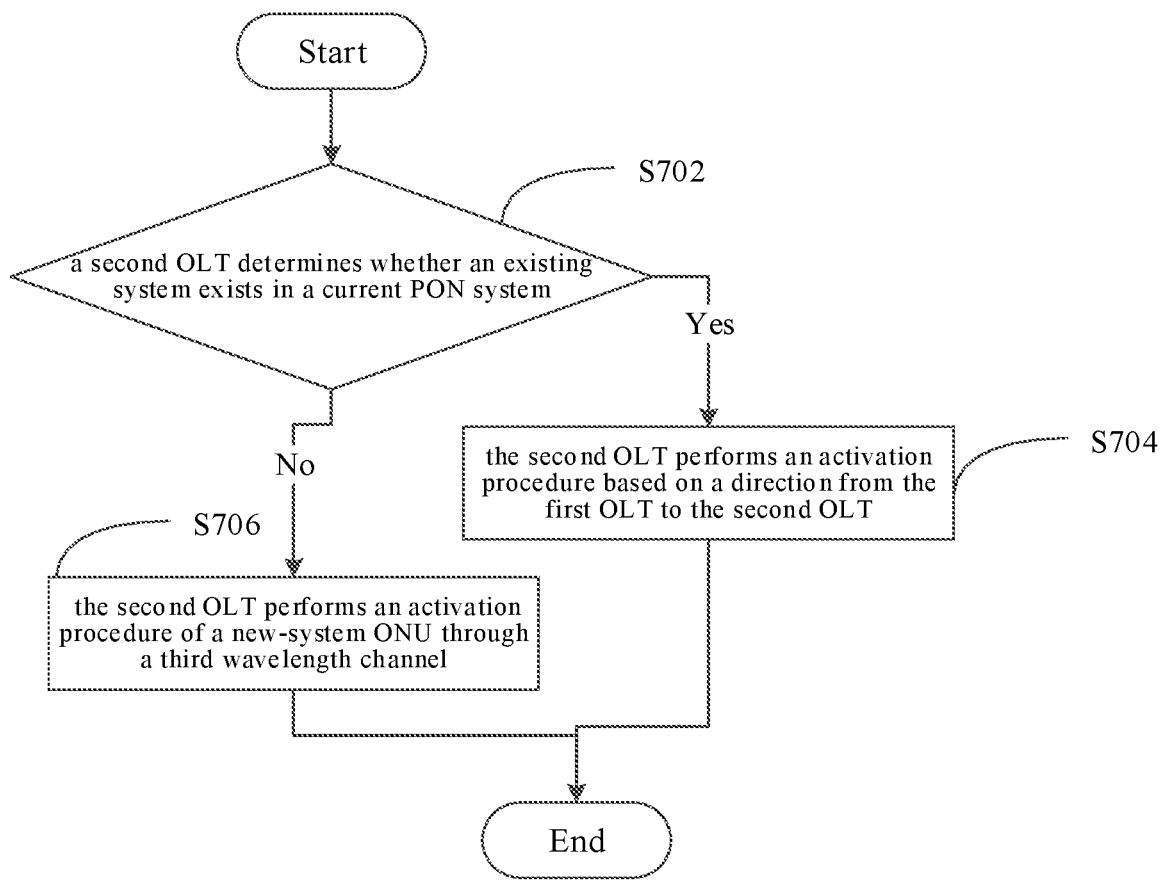
FIG. 7 is a flowchart illustrating an ONU activation method according to the present disclosure.

In the Embodiment One and the Embodiment Two, it is definite that the existing system exists, so that the ONU may be activated on the second OLT based on the activation process on the first OLT; in the Embodiment Three, it is definite that no existing system exists, so that all the ONUs are unambiguously activated on the OLT of the new system. That is, whether an existing system currently exists may affect the selection of an activation solution by the ONU. It is improper for the ONU to select the solution of the Embodiment Three for activation in a case where an existing system exists currently or to select the solution of the Embodiment One or the Embodiment Two in a case where no existing system exists currently, and the improper selection may keep the ONU from being normally activated. In order to ensure that the ONU can be normally activated all the time during the transition of the PON system from the existing system to the new system, the present embodiment provides a solution which is shown in a flowchart of FIG. 7.

At operation S702, a second OLT determines whether an existing system exists in a current PON.

If a determination result is yes, indicating that it is determined that the existing system exists in the current PON, and S704 is performed; otherwise, S706 is performed.

In some examples, the second OLT may determine whether a predefined channel exists between the second OLT and a first OLT, or may determine whether an ONU has received information sent by the first OLT. If the second OLT determines that the predefined channel exists between the second OLT and the first OLT, and/or that the ONU has received the information sent by the first OLT, it is indicated that the first OLT exists in the PON system currently, that is, the existing system exists.

At operation S704, the second OLT performs an activation procedure based on a direction from the first OLT to the second OLT.

If the second OLT determines that the existing system exists in the current PON system, the second OLT may enable a new-system ONU to be activated on the first OLT, and may acquire the activation information of the new-system ONU through the first OLT or through an activation agent ONU. Reference may be made to the description of the above Embodiment One and Embodiment Two for a specific implementation process, which is not repeated here.

At operation S706, the second OLT performs an activation procedure of the new-system ONU through a third wavelength channel.

If the second OLT determines that no existing system exists in the current PON system, it is impossible for the ONU to be activated on the first OLT, and it is also impossible to acquire the activation information of the ONU based on an activation process of the ONU on the first OLT. Thus, the second OLT may allow the ONU to be directly activated on the second OLT through the third wavelength channel other than a DAW channel or a service channel (a low-latency channel). Reference may be made to the description of the Embodiment Three for a specific implementation process.

The ONU activation method provided in the embodiment is applicable to a scenario of gradual transition of the PON system from the existing system to the new system. In such scenario, the second OLT can flexibly determine an activation solution according to whether the existing system exists, so that the ONU can be activated at a lower delay cost and a lower system performance cost.

Embodiment Five

The ONU activation method provided in each of the above embodiments is further illustrated by examples in the present embodiment. In the embodiment, a first OLT is an existing-system OLT, a second OLT is a low-latency OLT, and a new-system ONU is a low-latency ONU. The low-latency ONU supports both a DAW channel and a low-latency channel. The low-latency channel is used for communication between the low-latency ONU and the low-latency OLT and includes a low-latency uplink channel and a low-latency downlink channel. The DAW channel is merely used for communication between the low-latency ONU and the existing-system OLT.

Example One

The low-latency OLT checks whether an activation agent ONU exists at present; and if no activation agent ONU exists at present, the low-latency OLT initiates a registration procedure on the low-latency channel until one low-latency ONU completes registration, and appoints the registered ONU as the activation agent ONU. The low-latency OLT broadcasts information about the activation agent ONU in a downlink direction.

If the low-latency OLT initiates the registration procedure, the ONUs participate in activation and compete for the activation agent ONU. All the ONUs may be activated on the existing-system OLT until the activation agent ONU is determined. The activation agent ONU may be activated on the existing-system OLT after being appointed, the other ONUs may check the information about the activation agent ONU from the low-latency OLT in the downlink direction after being aware that the activation agent ONU is appointed. No ONU may be activated on the existing-system OLT if the low-latency OLT has not appointed the activation agent ONU, and all the ONUs may be activated on the existing-system OLT if the low-latency OLT has appointed the activation agent ONU.

In the activation processes of the other ONUs on the existing-system OLT, the activation agent ONU checks the activation processes and records the activation information generated during the activation processes. The activation information includes, but is not limited to, an ONU identification (e.g., an SN) and a ranging result. If the other ONUs complete the activation processes, the activation agent ONU reports the activation information to the low-latency OLT.

The low-latency OLT assigns ONU-IDs to corresponding SNs according to the activation information reported by the activation agent ONU, performs calculation on the ranging results on the DAW channel (please refer to the Embodiment One and the Embodiment Two for a specific calculation process), and applies the calculated ranging results to the low-latency channel.

Figure 8:
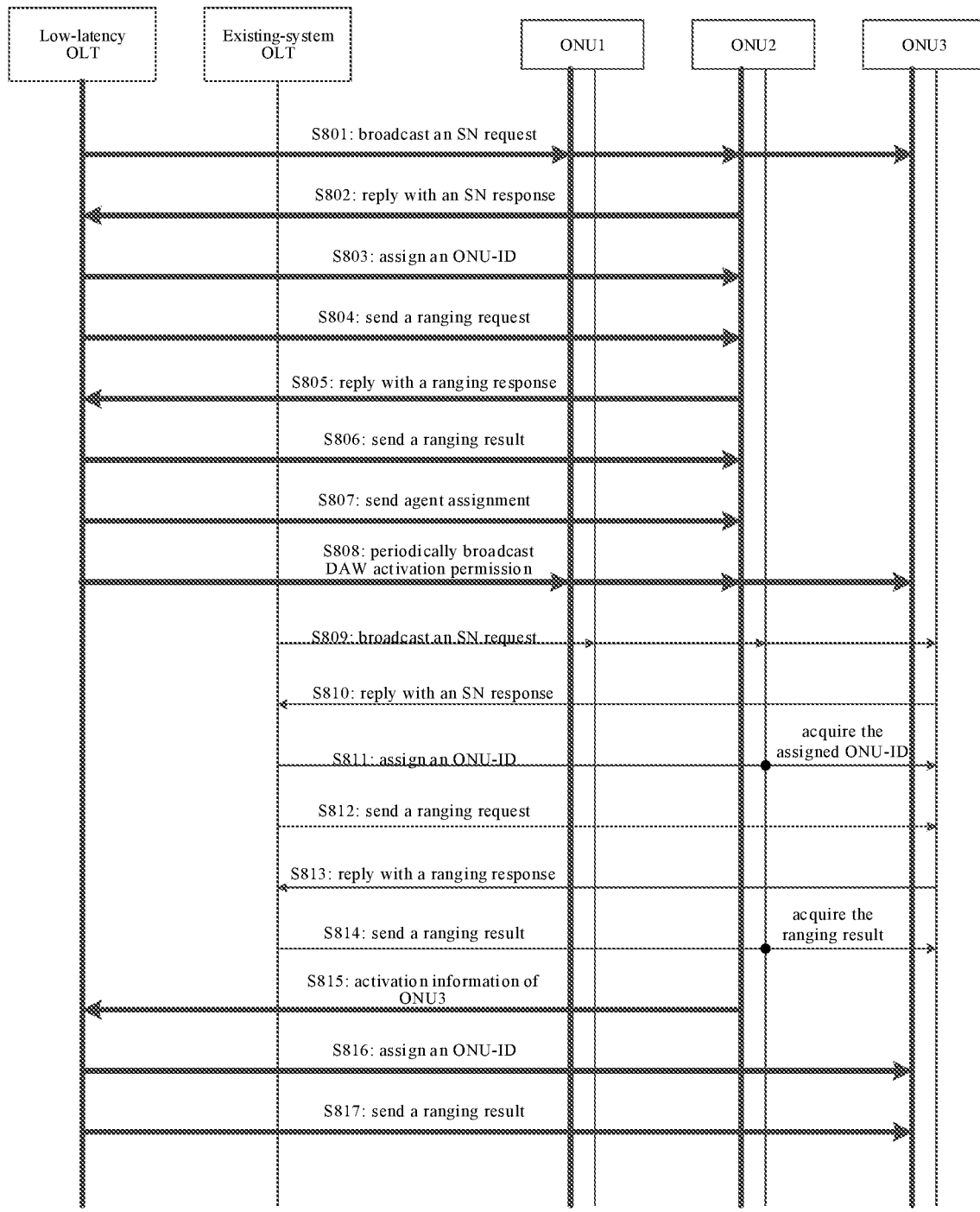
FIG. 8 is an interaction flowchart of an ONU activation method according to the present disclosure.

Please refer to an interaction flowchart of an ONU activation method shown in FIG. 8. Assuming that three new-system ONUs, namely ONU1, ONU2 and ONU3, exist in a PON system, each of the three ONUs has separate communication channels to the low-latency OLT and the existing-system OLT, and the three ONUs communicate with the low-latency OLT through the low-latency channel and communicate with the existing system through the DAW channel. In FIG. 8, thick lines represent communication in a low-latency system (i.e., the new system), and thin lines represent communication in the existing system.

At operation S801, the low-latency OLT broadcasts an SN request to each ONU.

At operation S802, the ONU2 replies to the low-latency OLT with an SN response.

At operation S803, the low-latency OLT assigns an ONU-ID to the ONU2.

At operation S804, the low-latency OLT sends a ranging request to the ONU2.

At operation S805, the ONU2 replies to the low-latency OLT with a ranging response.

At operation S806, the low-latency OLT sends a ranging result to the ONU2.

At operation S807, the low-latency OLT sends agent assignment to the ONU2.

At operation S808, the low-latency OLT periodically broadcasts DAW activation permission to each ONU.

At operation S809, the existing-system OLT broadcasts an SN request.

At operation S810, the ONU3 replies to the existing-system OLT with an SN response.

It is assumed here that the ONU3 receives the SN request broadcast by the existing-system OLT and decides to be activated on the existing-system OLT according to the broadcast SN request.

At operation S811, the existing-system OLT assigns an ONU-ID to the ONU3, and meanwhile the ONU2 acquires the ONU-ID assigned to the ONU3 by the existing-system OLT through checking.

At operation S812, the existing-system OLT sends a ranging request to the ONU3.

At operation S813, the ONU3 replies to the existing-system OLT with a ranging response.

At operation S814, the existing-system OLT sends a ranging result to the ONU3, and meanwhile the ONU2 acquires the ranging result sent by the existing-system OLT to the ONU3 through checking.

At operation S815, the ONU2 sends the acquired activation information of the ONU3 to the low-latency OLT through the low-latency channel.

At operation S816, the low-latency OLT assigns an ONU-ID to the ONU3.

At operation S817, the low-latency OLT sends a ranging result to the ONU3.

Thus, the ONU3 realizes activation on the low-latency OLT through the activation process on the existing-system OLT.

The activation agent ONU may be replaced. Normally, the activation agent ONU sends a replacement request to the low-latency OLT, and the low-latency OLT completes the change of the activation agent ONU after confirming the replacement with another activated ONU. If the activation agent ONU is offline before the low-latency OLT completes the change normally, and the low-latency OLT takes one of activated ONUs as a new activation agent ONU (in a case where at least one activated ONU exists), or reinitiates an activation procedure to appoint an activation agent ONU (in a case where no ONU exist). After the activation agent ONU is replaced, the ONUs which are not activated need to be activated again, and also need to be activated again on the existing-system OLT.

In the example, authentication of the ONU may be performed in a way of the existing system, including SN authentication and registration ID authentication. If authentication information is configured in the existing-system OLT, an authentication process is performed by the existing-system OLT; and if the authentication information is configured in an authentication server, the existing-system OLT performs authentication on the low-latency ONU through the authentication server.

In the example, there is no limitation to coexistent scenarios of the low-latency OLT and the existing-system OLT, so that the low-latency OLT and the existing-system OLT may be separate or integrated, may be integrated in a same chip, a same line card or a same frame.

Example Two

The low-latency OLT determines whether the activation agent ONU exists at present; and if no activation agent ONU exists at present, the low-latency OLT initiates a registration procedure on the low-latency channel until one low-latency ONU completes registration, and appoints the registered ONU as the activation agent ONU.

All the ONUs are activated on the DAW channel after being powered on, that is, being activated on the existing-system OLT.

The existing-system OLT sends the activation information of all the ONUs to the activation agent ONU, and the activation agent ONU forwards the activation information to the low-latency OLT, where the activation information including, but not limited to, SNs and ranging results.

Similarly, the low-latency OLT may send an activation information receipt acknowledgement to the existing-system OLT via the activation agent ONU.

The low-latency OLT assigns ONU-IDs to corresponding SNs according to the acquired activation information, performs calculation on the ranging results on the DAW channel (please refer to the Embodiment One and the Embodiment Two for a specific calculation process), and applies the calculated ranging results to the low-latency channel.

The activation agent ONU may be replaced. Normally, the activation agent ONU sends a replacement request to the low-latency OLT, and the low-latency OLT completes the change of the activation agent ONU after confirming the replacement with another activated ONU. If the activation agent ONU is offline before the low-latency OLT completes the change normally, and the low-latency OLT takes one of activated ONUs as a new activation agent ONU (in a case where at least one activated ONU exists), or reinitiates an activation procedure to appoint an activation agent ONU (in a case where no ONU exist). After the activation agent ONU is replaced, the ONUs which are not activated need to be activated again, and also need to be activated again on the existing-system OLT.

In the example, authentication of the ONU may be performed in a way of the existing system, including SN authentication and registration ID authentication. If authentication information is configured in the existing-system OLT, an authentication process is performed by the existing-system OLT; and if the authentication information is configured in an authentication server, the existing-system OLT performs authentication on the low-latency ONU through the authentication server.

In the example, there is no limitation to coexistent scenarios of the low-latency OLT and the existing-system OLT, so that the low-latency OLT and the existing-system OLT may be separate or integrated, may be integrated in a same chip, a same line card or a same frame.

Example Three

In the example, a predefined communication channel exists between the low-latency OLT and the existing-system OLT, and the predefined channel may be an internal channel in a same chip, an internal channel in a same line card, an internal channel in a same device, a directly connected channel (e.g., a straight through cable), or a channel established through a third-party system such as a network management system.

All the ONUs are activated on the DAW channel after being powered on, that is, being activated on the existing-system OLT.

The existing-system OLT synchronizes the activation information of all the ONUs to the low-latency OLT through the predefined channel, where the activation information including, but not limited to, SNs and ranging results.

The low-latency OLT assigns ONU-IDs to corresponding SNs according to the activation information acquired from the existing-system OLT, performs calculation on the ranging results on the DAW channel, and applies the calculated ranging results to the low-latency channel.

In the example, authentication of the ONU may be performed in a way of the existing system, including SN authentication and registration ID authentication. If authentication information is configured in the existing-system OLT, an authentication process is performed by the existing-system OLT; and if the authentication information is configured in an authentication server, the existing-system OLT performs authentication on the low-latency ONU through the authentication server.

In the example, there is no limitation to coexistent scenarios of the low-latency OLT and the existing-system OLT, so that the low-latency OLT and the existing-system OLT may be separate or integrated, may be integrated in a same chip, a same line card or a same frame.

Embodiment Six

The present embodiment provides an ONU activation device applied at a first OLT in an existing system. With reference to a schematic structural diagram shown in FIG. 9, an ONU activation device 90 includes a first information acquisition module 902 and an activation information sending module 904. The first information acquisition module 902 is configured to activate a new-system ONU through a DAW channel and acquire activation information of the new-system ONU. The activation information sending module 904 is configured to send the activation information of the new-system ONU to a second OLT in a new system.

The activation information includes, but is not limited to, at least one of ONU identification information or a ranging result.

The activation information sending module 904 may send the activation information of the new-system ONU to an activation agent ONU, and the activation agent ONU is a new-system ONU which has been activated on the second OLT; or the activation information sending module 904 may send the activation information of the new-system ONU to the second OLT through a predefined channel between the activation information sending module 904 and the second OLT.

The above predefined channel may be any one of the following channels: 1) an internal channel of a chip to which the first OLT and the second OLT belong; 2) an internal channel of a line card to which the first OLT and the second OLT belong; 3) an internal channel of a device to which the first OLT and the second OLT belong; 4) a directly connected channel, such as a straight through cable; or 5) a channel established through a third-party system, which may include, but is not limited to, a network management system.

Figure 10:
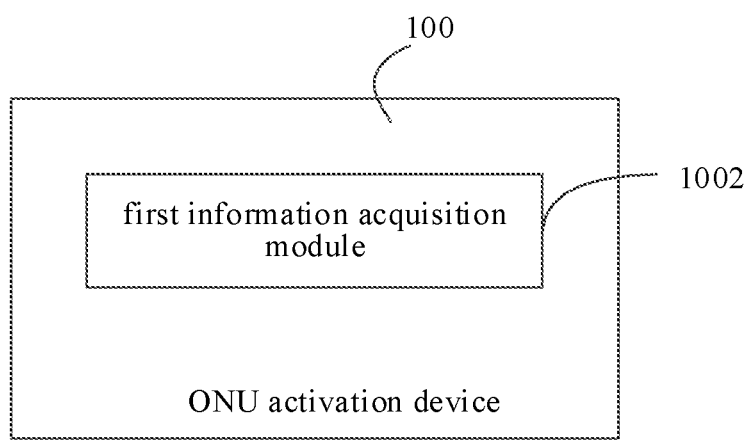
FIG. 10 is another schematic structural diagram of an ONU activation device applied at the first OLT according to the present disclosure.

The embodiment further provides another ONU activation device applied at the first OLT in the existing system. With reference to FIG. 10, an ONU activation device 100 includes a first information acquisition module 1002 configured to acquire activation information of a new-system ONU through a DAW channel.

The ONU activation device 100 shown in FIG. 10 does not need to pay attention to how the second OLT acquires activation information of an ONU generated during activation of the ONU on the first OLT, and just needs to activate the ONU.

Figure 9:
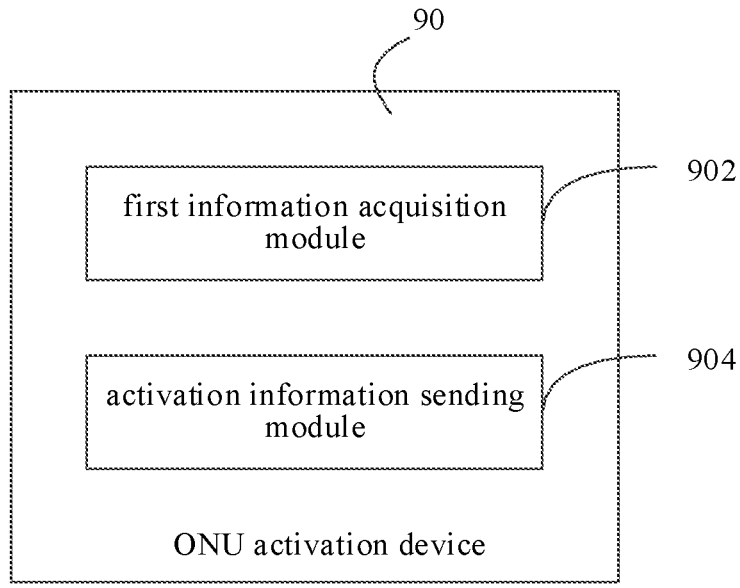
FIG. 9 is a schematic structural diagram of an ONU activation device applied at a first OLT according to the present disclosure.

FIG. 9 and FIG. 10 show two ONU activation devices applied at the first OLT, the ONU activation device 90 and the ONU activation device 100 can be deployed on the first OLT, and all the functions of the first information acquisition module 902, the first information acquisition module 1002 and the activation information sending module 904 can be performed by a processor together with a communication unit of a network device where the first OLT is located.

In addition, the embodiment further provides an ONU activation device applied at the second OLT in the new system.

Figure 11:
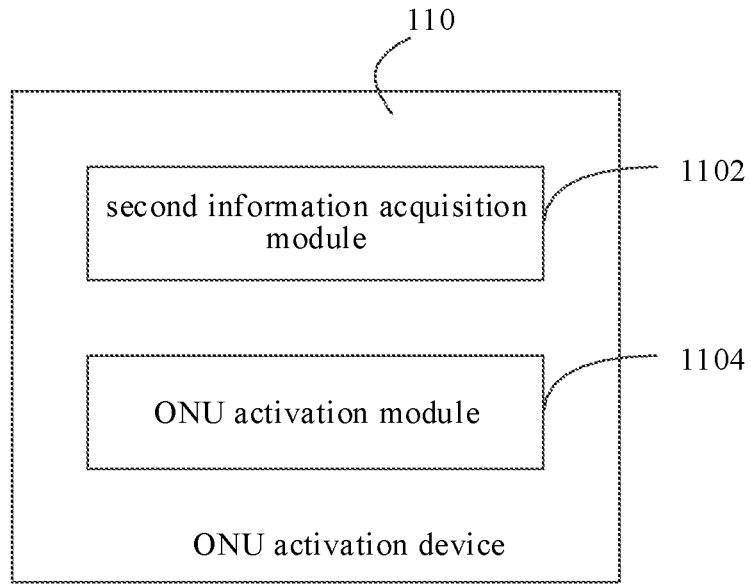
FIG. 11 is a schematic structural diagram of an ONU activation device applied at a second OLT according to the present disclosure.

As shown in FIG. 11, an ONU activation device 110 includes a second information acquisition module 1102 and an ONU activation module 1104. The second information acquisition module 1102 is configured to acquire activation information of a new-system ONU on the first OLT in the existing system, and the activation information is generated in an activation process of the new-system ONU on the first OLT in the existing system through a DAW channel. The ONU activation module 1104 is configured to activate the new-system ONU according to the activation information acquired by the second information acquisition module 1102.

The second information acquisition module 1102 may receive activation information sent by the first OLT through the predefined channel which may be found in the above description.

Alternatively, the second information acquisition module 1102 may receive activation information sent by an activation agent ONU through a service channel. In some examples, the activation information sent by the activation agent ONU to the second OLT is acquired by the activation agent ONU through checking the activation process of the new-system ONU on the first OLT or through receiving from the first OLT.

In some examples, before the second information acquisition module 1102 receives the activation information sent by the activation agent ONU through the service channel, the ONU activation device 110 may activate a new-system ONU, and appoints the new-system ONU as a current activation agent ONU; and then the ONU activation device 110 notifies each ONU in the new system of the current activation agent ONU through the service channel.

Before the ONU activation device 110 appoints the new-system ONU as the current activation agent ONU, the ONU activation device 110 may determine whether the first OLT exists in a PON system.

In some examples, if the ONU activation device 110 determines that the first OLT does not exists in the PON system, the ONU activation device 110 activates the new-system ONU through a third wavelength channel, which is a channel other than the service channel or the DAW channel.

In some examples, the ONU activation module 1104 may determine a difference between activation information of the activation agent ONU on the second OLT and activation information of the activation agent ONU on the first OLT before activating a new-system ONU; then the ONU activation module 1104 determines activation information of non-activation agent ONUs among the new-system ONUs on the second OLT according to the difference and activation information of the non-activation agent ONUs on the first OLT; and finally, the ONU activation module 1104 activates the non-activation agent ONUs according to the activation information of the non-activation agent ONUs on the second OLT.

The ONU activation device 110 is deployed at the second OLT, and all the functions of the second information obtaining module 1102 and the ONU activation module 1104 can be performed by a processor together with a communication unit of a network device where the second OLT is located.

Reference may be made to the description of the above embodiments for specific details of implementation of corresponding ONU activation methods by the ONU activation device 90, the ONU activation device 100 and the ONU activation device 110, and those details are not repeated here.

The embodiment further provides an ONU control device applied at an ONU in the new system, and the ONU control device mainly aims to perform a function of an activation agent ONU. Please refer to a schematic structural diagram of an ONU control device 120 shown in FIG. 12.

A first activation control module 1202 is configured to perform activation on the second OLT in the new system.

An activation information acquisition module 1204 is configured to acquire activation information of a new-system ONU generated during activation of the new-system ONU on the first OLT.

An activation agent forwarding module 1206 is configured to send the activation information to the second OLT through a service channel.

The activation information acquisition module 1204 may acquire activation information of other new-system ONUs by checking during activation processes of the other new-system ONUs on the first OLT; or the activation information acquisition module 1204 may receive the activation information of the new-system ONUs sent by the first OLT.

In some examples, when the activation information acquisition module 1204 acquires the activation information of the new-system ONU generated during the activation of the new-system ONU on the first OLT, the activation information acquisition module 1204 may acquire the activation information by checking during the activation process of the new-system ONUs on the first OLT; or the activation information acquisition module 1204 may receive the activation information of the new-system ONU sent by the first OLT.

The ONU control device 120 is deployed on an ONU, and all the functions of the first activation control module 1202, the activation information acquisition module 1204 and the activation agent forwarding module 1206 in the ONU control device 120 can be performed by a processor together with a communication unit in the ONU. Reference may be made to the description of the above embodiments for other details of the implementation of an ONU activation method by the ONU control device 120, and those details are not repeated here.

Figure 12:
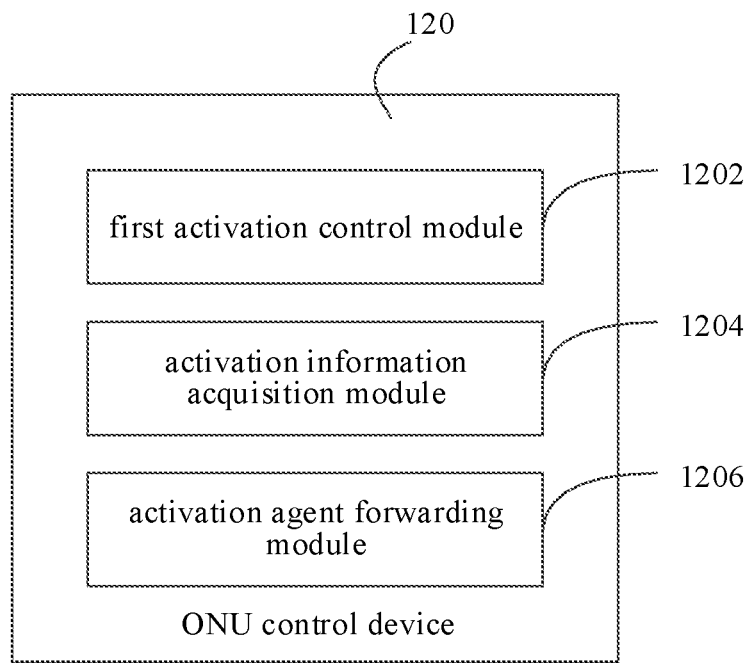
FIG. 12 is a schematic structural diagram of an ONU control device applied at an ONU according to the present disclosure.
Figure 13:
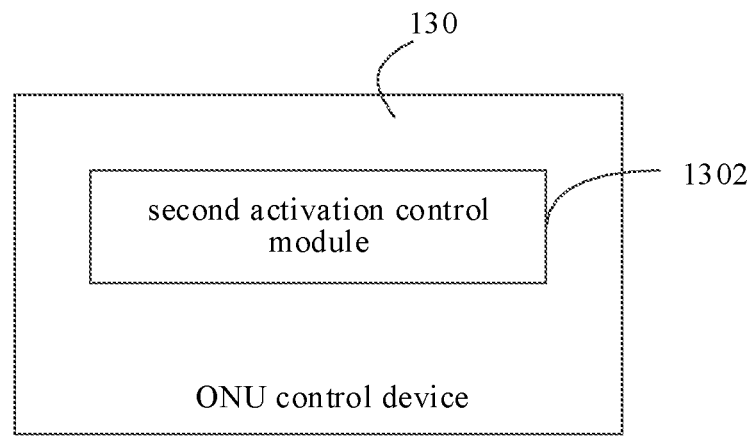
FIG. 13 is another schematic structural diagram of an ONU control device applied at an ONU according to the present disclosure.

When the ONU control device 120 illustrated by FIG. 12 performs the ONU activation method, the second OLT needs to select an activation agent ONU. The embodiment further provides another ONU control device which mainly aims to perform a function of a non-activation agent ONU in the new system, as shown in FIG. 13. An ONU control device 130 includes a second activation control module 1302 configured to perform activation on the first OLT in the existing system through a DAW channel.

In an example, before the second activation control module 1302 perform activation on the first OLT in the existing system through the DAW channel, the ONU control device 130 may receive a broadcast message sent by the second OLT to determine an activation agent ONU which has been activated on the second OLT before the ONU is activated on the first OLT in the existing system through the DAW channel.

Both the ONU control device 120 and the ONU control device 130 perform activation on the second OLT through a third wavelength channel if no first OLT exists in the PON system, and the third wavelength channel is a channel other than the service channel or the DAW channel.

The ONU control device 120 or the ONU control device 130 determines whether the first OLT exists in the PON system by determining whether a predefined channel exists between the second OLT and the first OLT or by determining whether a message sent by the first OLT has been received.

If the ONU control device 120 or the ONU control device 130 determines that a predefined channel exists between the second OLT and the first OLT, or determines that a message sent by the first OLT has been received, the ONU control device 120 or the ONU control device 130 determines that the first OLT exists in the PON system.

After the ONU control device 120 or the ONU control device 130 completes activation on the second OLT through the third wavelength channel, if a wavelength of the third wavelength channel and a wavelength of an uplink service channel are not coexistent, the ONU control device 120 or the ONU control device 130 controls to close the third wavelength channel; if the wavelength of the third wavelength channel and the wavelength of the uplink service channel are coexistent, the ONU control device 120 or the ONU control device 130 processes the third wavelength channel in any one of the following ways: taking the third wavelength channel as a supplementary channel of the service channel; taking the third wavelength channel as a standby channel of the service channel; controlling the third wavelength channel to enter an energy-saving state; or controlling to close the third wavelength channel.

Embodiment Seven

The present embodiment provides a storage medium having at least one of a first ONU activation program, a second ONU activation program, a third ONU activation program, or a fourth ONU activation program stored therein. The first ONU activation program may be executed by one or more processors to implement the operations at the first OLT in the ONU activation method described in the Embodiment One or the Embodiment Two. The second ONU activation program may be executed by one or more processors to implement the operations at the first OLT in the ONU activation method described in the Embodiment Three. The third ONU activation program may be executed by one or more processors to implement the operations at the second OLT in the ONU activation methods described in the Embodiment One to the Embodiment Three. The fourth ONU activation program may be executed by one or more processors to implement the operations at the ONU in the ONU activation methods described in the Embodiment One to the Embodiment Three.

Figure 14:
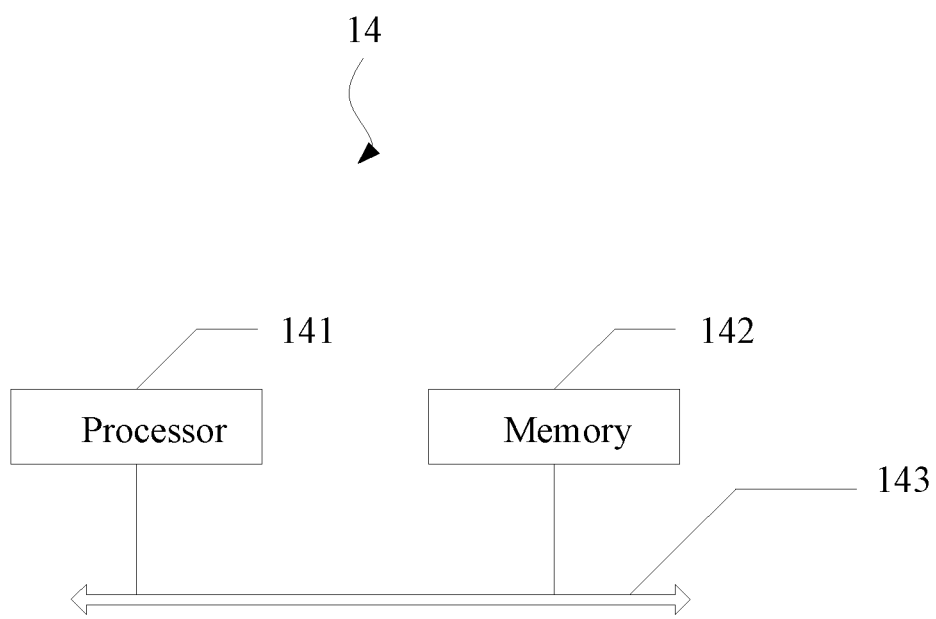
FIG. 14 is a schematic diagram of a hardware structure of a network device according to the present disclosure.

The embodiment further provides a network device, as shown in FIG. 14, a network device 14 includes a processor 141, a memory 142 and a communication bus 143.

The communication bus 143 is configured to enable connection and communication between the processor 141 and the memory 142.

The processor 141 is configured to execute a first ONU activation program stored in the memory 142, so as to implement the operations at the first OLT in the ONU activation methods described in the above embodiments; or the processor 141 is configured to execute a second ONU activation program stored in the memory 142, so as to implement the operations at the second OLT in the ONU activation methods described in the above embodiments; or the processor 141 is configured to execute a third ONU activation program stored in the memory 142, so as to implement the operations at the activation agent ONU in the ONU activation methods described in the above embodiments; or the processor 141 is configured to execute a fourth ONU activation program stored in the memory 142, so as to implement the operations at the non-activation agent in the ONU activation methods described in the above embodiments.

The embodiment further provides a PON system, including an existing system and a new system. The existing system includes a first OLT, and the new system includes a second OLT and a plurality of ONUs. The new system may be a low-latency system, the second OLT is a low-latency OLT, and the ONUs in the new system are low-latency ONUs. The ONUs in the new system include an activation agent ONU and non-activation agent ONUs.

The first OLT is a network device where the processor 141 executes the first ONU activation program, the second OLT is a network device where the processor 141 executes the second ONU activation program, the activation agent ONU is a network device where the processor 141 executes the third ONU activation program, and the non-activation agent ONU is a network device where the processor 141 executes the fourth ONU activation program.

The network device and the PON system provided in the embodiment can implement the processes of the ONU activation methods provided in the above embodiments, reference may be made to the description of the above embodiments for details of the implementation of the ONU activation methods, and those details are not repeated here.

In the network device and the PON system provided in the embodiment, the new-system ONU is activated on the first OLT in the existing system through the DAW channel, and the new-system ONU does not need to be activated on the second OLT in the new system through the DAW channel, and the DAW channel is merely used for the communication between the new-system ONU and the first OLT, and does not need to be connected to the second OLT through an optical splitter, thereby avoiding the problem of the signal attenuation of the existing-system OLT due to the optical splitter. Therefore, the technical solutions provided by the embodiment of the present disclosure can not only reduce the influence of ONU activation on service delay, but also obviate the influence of the optical splitter on a communication effect of the existing system, thereby enhancing the communication performance of the PON.

According to the activation methods, the activation devices, the control device, the network device and the optical network system provided in the present disclosure, the new-system ONU is activated on the first OLT of the existing system, and then the activation information of the new-system ONU is sent to the second OLT in the new system by the first OLT or by the activation agent ONU which is activated on the second OLT, so that the second OLT in the new system can acquire the activation information of each of the new-system ONUs without opening a quiet window to each of the new-system ONUs on the service channel, and can further allow for activation of the new-system ONUs on the second OLT.

It should be understood by those of ordinary skill in the art that the functional modules/units in all or some of the operations, the systems and the devices in the methods disclosed above may be implemented as software (may be implemented as program codes executable by a computing device), firmware, hardware, or suitable combinations thereof. If implemented as hardware, the division between the functional modules/units stated above is not necessarily corresponding to the division of physical components; for example, one physical component may have a plurality of functions, or one function or operation may be performed through cooperation of several physical components. Some or all of the physical components may be implemented as software executed by a processor, such as a central processing unit, a digital signal processor or a microprocessor, or may be implemented as hardware, or may be implemented as an integrated circuit, such as an application specific integrated circuit. Such software may be distributed on a computer-readable medium and is executed by a computing device. In some cases, the operations illustrated or described may be executed in an order different from that described herein. The computer-readable medium may include a computer storage medium (or a non-transitory medium). As well known by those of ordinary skill in the art, the term "computer storage medium" includes volatile/nonvolatile and removable/non-removable media used in any method or technology for storing information (such as computer-readable instructions, data structures, program modules and other data). The computer storage medium includes, but is not limited to, a Random Access Memory (RAM), a Read-Only Memory (ROM), an Electrically Erasable Programmable Read-Only Memory (EEPROM), a flash memory or other memory techniques, a Compact Disc Read Only Memory (CD-ROM), a Digital Versatile Disc (DVD) or other optical discs, a magnetic cassette, a magnetic tape, a magnetic disk or other magnetic storage devices, or any other medium which can be configured to store desired information and be accessed by a computer. Therefore, the present disclosure is not limited to any specific combination of hardware and software.

The above is a further detailed description of the embodiments of the present disclosure in conjunction with the specific implementations, but the specific implementations of the present disclosure are not limited to the above description. Simple deductions or substitutions can be made by those of ordinary skill in the art without departing from the concept of the present disclosure, and should be considered to fall within the scope of the present disclosure.

What is claimed is:

1. An ONU activation method, comprising:
   acquiring, by a second OLT, activation information of a new-system ONU activated on a first OLT in an existing system, wherein the second OLT is an OLT in a new system and the activation information is generated in an activation process of the new-system ONU on the first OLT through a DAW channel; and
   activating, by the second OLT, the new-system ONU according to the activation information;
   wherein acquiring, by the second OLT, the activation information of the new-system ONU activated on the first OLT in the existing system comprises:
   receiving, by the second OLT, the activation information sent by an activation agent ONU through a service channel, wherein the activation agent ONU is one new-system ONU which has been activated on the second OLT.

2. The ONU activation method of claim 1, wherein
   the activation information sent by the activation agent ONU to the second OLT is acquired by the activation agent ONU by checking the activation process of the new-system ONU on the first OLT; or
   the activation information sent by the activation agent ONU to the second OLT is received by the activation agent ONU from the first OLT.

3. The ONU activation method of claim 1, before receiving, by the second OLT, the activation information sent by the activation agent ONU through the service channel, further comprising:
   activating, by the second OLT, one new-system ONU; and
   appointing, by the second OLT, the activated one new-system ONU as the activation agent ONU.

4. The ONU activation method of claim 3, before appointing, by the second OLT, the activated one new-system ONU as the activation agent ONU, further comprising:
   determining, by the second OLT, whether the first OLT exists in a Passive Optical Network (PON) system.

5. The ONU activation method of claim 4, wherein determining, by the second OLT, whether the first OLT exists in the PON system comprises:
   determining, by the second OLT, whether the first OLT exists in the PON system by determining whether the predefined channel exists between the second OLT and the first OLT or by determining whether the new-system ONU has received a message sent by the first OLT; and
   determining, by the second OLT, that the first OLT exists in the PON system in response to a case where the second OLT determines that the predefined channel exists between the second OLT and the first OLT or in response to a case where the second OLT determines that the new-system ONU has received a message sent by the first OLT.

6. The ONU activation method of claim 1, before receiving, by the second OLT, the activation information sent by the activation agent ONU through the service channel, further comprising:
   notifying, by the second OLT, each new-system ONU of one piece of the following information through the service channel: information about a current activation agent ONU, information that the activation agent ONU is determined, or information about carrying out activation on the first OLT through the DAW channel.

7. The ONU activation method of claim 1, wherein activating, by the second OLT, the new-system ONU according to the activation information comprises:
   determining, by the second OLT, a difference between activation information of the activation agent ONU activated on the second OLT and activation information of the activation agent ONU activated on the first OLT, wherein the activation agent ONU is a new-system ONU which has been activated on the second OLT before the second OLT acquires the activation information of the new-system ONU activated on the first OLT;
   determining, by the second OLT, activation information of a non-activation agent ONU among new-system ONUs activated on the second OLT according to the difference and activation information of the non-activation agent ONU activated on the first OLT; and
   activating, by the second OLT, the non-activation agent ONU among the new-system ONUs according to the activation information of the non-activation agent ONU activated on the second OLT.

8. An ONU activation method, comprising:
   activating an ONU on a second OLT in a new system;
   acquiring, by the ONU, activation information of a new-system ONU generated during activation of the new-system ONU on a first OLT in an existing system; and
   sending, by the ONU, the activation information to the second OLT through a service channel.

9. The ONU activation method of claim 8, before acquiring, by the ONU, the activation information of the new-system ONU generated during the activation of the new-system ONU on the first OLT in the existing system, further comprising:
   activating the ONU on the first OLT through a DAW channel.

10. The ONU activation method of claim 9, wherein acquiring, by the ONU, the activation information of the new-system ONU generated during the activation of the new-system ONU on the first OLT in the existing system comprises:

acquiring, by the ONU, the activation information by checking during the activation of the new-system ONU on the first OLT; or receiving, by the ONU, the activation information of the new-system ONU sent by the first OLT.

11. The ONU activation method of claim 9, wherein the ONU determines whether the first OLT exists in the PON system by determining whether a predefined channel exists between the second OLT and the first OLT or by determining whether the ONU has received a message sent by the first OLT; and the ONU determines that the first OLT exists in the PON system in response to a case where the ONU determines that the predefined channel exists between the second OLT and the first OLT or in response to a case where the ONU determines that the ONU has received a message sent by the first OLT.

12. An ONU activation method, comprising:

activating an ONU on a first OLT in an existing system through a DAW channel, wherein the ONU is an ONU in a new system, wherein before activating the ONU on the first OLT in the existing system through the DAW channel, the method further comprises:

receiving, by the ONU, a broadcast message sent by a second OLT in the new system to determine an activation agent ONU, wherein the activation agent ONU is a new-system ONU which has been activated on the second OLT before the ONU is activated on the first OLT in the existing system through the DAW channel, and activating the ONU on the first OLT in the existing system through the DAW channel comprises:

activating the ONU on the first OLT through the DAW channel after the activation agent ONU is activated on the first OLT.

13. The ONU activation method of claim 12, wherein the ONU determines whether the first OLT exists in the PON system by determining whether a predefined channel exists between the second OLT and the first OLT or by determining whether the ONU has received a message sent by the first OLT; and the ONU determines that the first OLT exists in the PON system in response to a case where the ONU determines that the predefined channel exists between the second OLT and the first OLT or in response to a case where the ONU determines that the ONU has received a message sent by the first OLT.

* * * * *